May 10, 1949. W. C. WARD ET AL 2,469,618
VAGINAL SUPPOSITORY
Filed Sept. 21, 1945
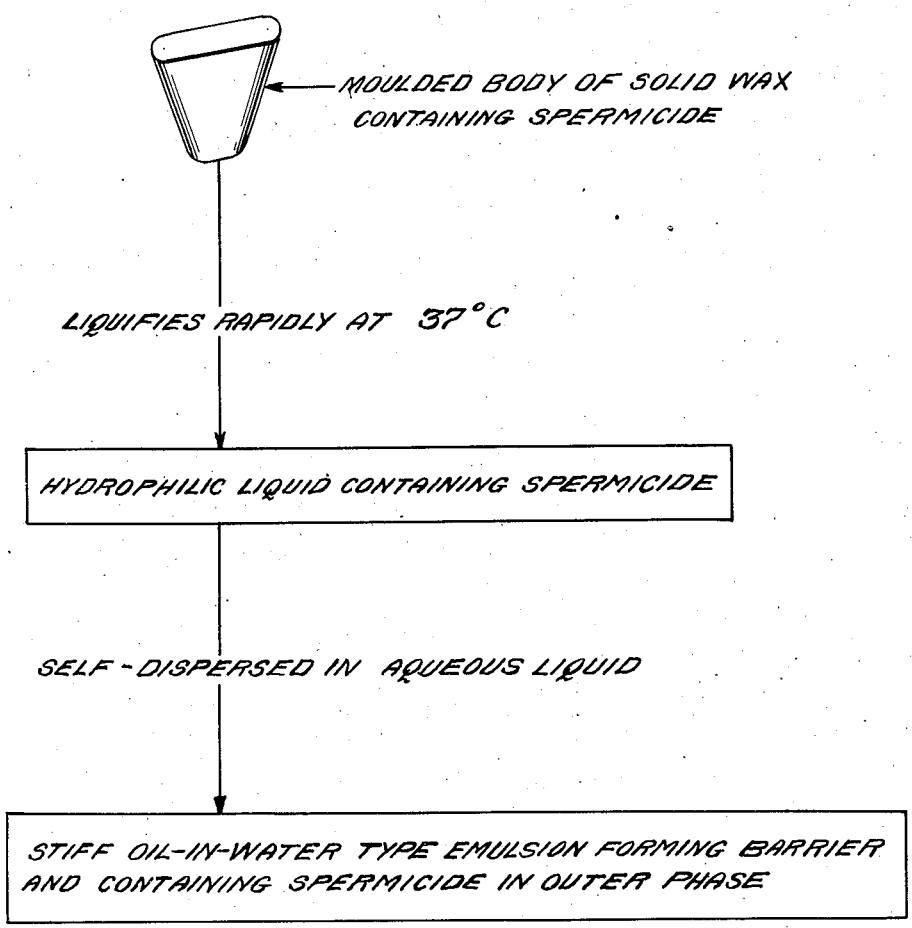
INVENTORS
WILLIAM C. WARD
ALBERT B. SCOTT
BY
Byerly, Watson & Simonds
ATTORNEYS Patented May 10, 1949

2,469,618

UNITED STATES PATENT OFFICE 2,469,618

VAGINAL SUPPOSITORY

William C. Ward and Albert B. Scott, Norwich, N. Y., assignors to Eaton Laboratories, Inc., Norwich, N. Y., a corporation of New York Application September 21, 1945, Serial No. 617,722

7 Claims. (Cl. 167—64)

This invention relates to vaginal suppositories.

Contraceptives now in use include two types—mechanical and chemical. The mechanical type for vaginal use, usually termed a diaphragm, operates by providing a barrier to prevent the spermatozoa from entering the uterine cervix. The chemical type includes an active spermicidal agent which is distributed in the vagina to kill the spermatozoa with which it comes in contact. Both types have presented inconveniences in use and each is far from certain in its effectiveness.

The vaginal suppository which we have invented combines the functions of the mechanical and chemical contraceptives heretofore used. It provides a barrier to bar the spermatozoa from the cervix and at the same time distributes over the surface of the vagina an active spermicidal agent. By combining these two functions, it is more reliable and certain in its effectiveness than previous contraceptives.

The new vaginal suppository which we have invented has the form of a molded solid body of wax which has the peculiar property of melting rapidly and completely at body temperature to form an anhydrous but hydrophilic liquid which has the property of dispersing itself in water or aqueous body liquids to form a stiff emulsion of the oil-in-water type. The emulsion is so tenacious that it exercises a physical barrier action. It can span an orifice of considerable diameter and as a result is effective in barring the spermatozoa from entering the cervix. In addition to its barrier function, the emulsion provides an efficient vehicle for a spermicidal agent. A spermicidal agent is effectively transferred to the external aqueous phase of the emulsion where it is available to perform its intended function.

The molded body of wax has as its main component a non-ionic, surface-active, anhydrous, hydrophilic compound whose melting point approximates body temperature (37° C.) within a few centigrade degrees. When the compound used has a melting point at or slightly below 37° C., it may constitute the entire waxy body. By "melting point," we mean the temperature at which the compound melts rapidly and completely. If, however, the compound has a melting point slightly above 37° C., there is incorporated with it a minor component having a melting point below 37° C. so as to give the complete wax a narrow melting range extending downwardly from 37° C. to about 34° C. The minor component is non-ionic and anhydrous, and compatible with the main component. It is desirable, but not necessary, that the minor component possess also the other properties of the main component which have been mentioned.

The main component of the waxy body is most desirably a polyoxyethylene ether of a partial ester of a fatty acid and a polyhydroxy hexitol cyclic inner ether having a melting point approximating 37° C. within a few degrees. We have found that the class of such ethers which contain from 2 to 5 polyoxyethylene groups and are derived from partial esters of fatty acids containing from 14 to 18 carbon atoms have melting points approximating 37° C. within a few degrees when the ratio of the number of oxyethylene groups to the total number of carbon atoms of the fatty acid is not greater than 1:4, and that the compounds of this class when liquid are capable of dispersing themselves in water to form stiff emulsions of the oil-in-water type. It is, therefore, a feature of our invention to use an ether of this class as the main component of the molded waxy body.

While the exact structure of the compounds referred to is not known, the class of compounds from which we find it desirable to select the main component of the waxy body is indicated succinctly by the following diagrammatic formula and equations:

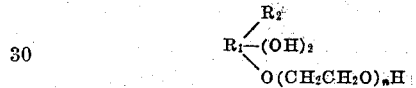

$R_1$ = a saturated cyclic inner ether containing 6 C atoms
$R_2$ = radical of a fatty acid containing $x$ C atoms
$x = 14, 16,$ or $18$
$n = 2, 3, 4,$ or $5$ $$n:x<1:4$$

The waxy body may consist entirely of a compound of the class above designated, but, when the compound selected from this class has a melting point above 37° C., it is desirable to incorporate with it a minor proportion of a compatible minor component whose melting point is less than 37° C. so as to give the waxy body a narrow melting range extending downward from 37° C. to about 34° C.

Because of the blocking action of the stiff oil-in-water emulsion which it forms, the waxy body in itself is as effective as some contraceptives that are now used.

In order to give the vaginal suppository the double action hereinabove described, there is incorporated (preferably dissolved) in the waxy body a small proportion of a spermicidal agent having some solubility in water. While various known spermicidal agents may be used, we have found a phenylmercurial salt, such as phenylmercuric acetate, most effective. An amount of this agent equal in weight to five ten-thousandths of the weight of the waxy body is dissolved in it. On emulsification, the mercurial is transferred to the outer aqueous phase of the emulsion and exercises an effective spermicidal action. Other spermicidal agents which may be used include phenylmercuric nitrate and glycollate. The proportion of spermicide used may be varied to some extent but we prefer the proportion given because it has been proved clinically to be low enough to avoid any toxic effect in the case of frequent use and high enough to be effective.

In order to enable those skilled in the art to compound our new vaginal suppository, we give specific formulations embodying our invention:

*Example I*

| | Parts by weight |
|---|---|
| A. Sorbitan monostearate hydroxy polyoxyethylene ether with 4 oxyethylene groups per mol. (M. P. 38° C.) | 90 |
| B. Sorbitan monostearate hydroxy polyoxyethylene ether with 20 oxyethylene groups per mol. (liquid) | 10 |
| C. Phenylmercuric acetate | 0.05 |

Ingredient A is the main component. It may be represented by the following diagrammatic formula:

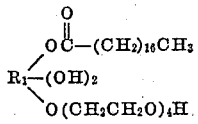

where $R_1$ is a saturated cyclic inner ether contaning 6 C atoms. It will be seen that this compound is a member of the class designated above since it contains 4 oxyethylene groups and the radical of stearic acid containing 18 carbon atoms, so that the ratio designated $n:x$ above is 4:18 which is equal to 1:4.5 and therefore less than 1:4. The compound may be prepared in known manner by reacting sorbitol obtained by the reduction of glucose with stearic acid under conditions leading to the formation of the corresponding cyclic inner ethers and the esterification thereof by the acid. The hydroxy polyoxyethylene ether of the partial ester is prepared either by etherification of the partial ester by heating with a preformed polyethylene glycol or more conveniently by reacting the ester with ethylene oxide in the presence of suitable catalysts (see Griffin U. S. Patent 2,374,931, p. 3). The melting point of the compound is 38° C., a degree above body temperature.

Ingredient B is prepared in a similar manner. It has a melting point well below 37° C., being a liquid at ordinary temperature. It is compatible with ingredient A and a minor proportion of it is incorporated to reduce the melting point of the waxy body to below 37° C.

In making the waxy body, the ingredient A is melted, ingredient B is incorporated with it, and ingredient C is dissolved in the mixture. The melted mass is molded in the form of a suppository and allowed to cool and harden.

The waxy body thus formed melts in the vagina in less than 10 minutes, forming an anhydrous hydrophilic liquid which emulsifies itself in the aqueous fluid present to form a stiff tenacious emulsion of the oil-in-water type providing the barrier action previously referred to and containing the phenylmercuric acetate in the outer water phase. This operation is indicated in the accompanying flow diagram.

Changes may be made in the specific formula given without modifying the action of the vaginal suppository. Thus, the minor component added to reduce the melting point need not be a compound of the same general structure as the main component. We have found that ingredient B in the above formula may be replaced by a minor proportion, for example 10 parts, of a fatty acid ester or a mineral oil, or, in general, by any animal, vegetable or mineral fat or oil or other non-ionic, anhydrous, oleaginous material having a melting point low enough to cause the desired slight reduction in the melting point of the waxy body. A few examples of such substitutions are given below:

*Example II*

| | Parts by weight |
|---|---|
| A. Sorbitan monostearate hydroxy polyoxyethylene ether with 4 oxyethylene groups per mol. (M. P. 38° C.) | 90 |
| B. Sorbitan monoricinoleate (liquid) | 10 |
| C. Phenylmercuric acetate | 0.05 |

*Example III*

| | Parts by weight |
|---|---|
| A. Sorbitan monostearate hydroxy polyoxyethylene ether with 4 oxyethylene groups per mol. (M. P. 38° C.) | 92 |
| B. Heavy mineral oil (U. S. P.) | 8 |
| C. Phenylmercuric acetate | 0.05 |

*Example IV*

| | Parts by weight |
|---|---|
| A. Sorbitan monostearate hydroxy polyoxyethylene ether with 4 oxyethylene groups per mol. (M. P. 38° C.) | 90 |
| B. Glyceryl laurate (commercial, M. P. 25–28° C.) | 10 |
| C. Phenylmercuric acetate | 0.05 |

As a result of tests of the compound of Example IV, we have discovered the hitherto unknown fact that glyceryl laurate has a distinct spermicidal action. In view of this property of glyceryl laurate, we have found it possible to make an effective vaginal suppository without the use of a mercurial or similar spermicidal agent. A formula for such a contraceptive body is given below:

*Example V*

| | Parts by weight |
|---|---|
| A. Sorbitan monostearate hydroxy polyoxyethylene ether with 4 oxyethylene groups per mol. (M. P. 38° C.) | 90 |
| B. Glyceryl laurate (commercial, M. P. 25–28° C.) | 10 |

Other compounds within the class previously designated may be used as the main ingredient of the waxy body in place of ingredient A of the above examples. This is illustrated by the following formula:

*Example VI*

| | Parts by weight |
|---|---|
| A. Sorbitan monopalmitate hydroxy polyoxyethylene ether with 2 oxyethylene groups per mol. (M. P. 40° C.) | 75 |

|  | Parts by weight |
|---|---|
| B. Glyceryl laurate (commercial, M. P. 25°–28° C.) | 25 |
| C. Phenylmercuric acetate | 0.05 |

Ingredient A, the main component, may be represented by the following diagrammatic formula:

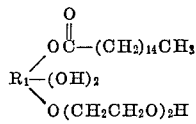

where $R_1$ is a saturated cyclic inner ether containing 6 C atoms. This compound is a member of the class designated above since it contains 2 oxyethylene groups and the radical of palmitic acid containing 16 carbon atoms, so that the ratio designated $n:x$ above is 2:16 or 1:8, which is less than 1:4. The compound may be prepared in the same manner as the main component of Example I. Its melting point is somewhat above that of the main component of Example I and a larger proportion of a minor component is therefore required to bring the melting range of the complete waxy body below 37° C.

It is to be noted that while the waxy bodies of all the examples given readily emulsify themselves in water when liquid, no one of them contains any of the ionic emulsifying agents ordinarily used to form oil-in-water emulsions. This is a distinct advantage, as we have found that ionic compounds invariably irritate the mucous membrane when frequently applied to it.

Extensive clinical tests have demonstrated the contraceptive effectiveness of our new vaginal suppository, and have established that it is non-irritating and has no poisonous or other harmful effect.

What is claimed is:

1. A vaginal suppository comprising a base whose main component consists of a chemical compound designated by the following diagrammatic formula and equations:

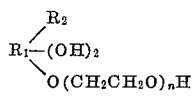

$R_1$ = a saturated cyclic inner ether containing 6 C atoms $R_2$ = radical of a fatty acid containing $x$ C atoms
$x$ = 14, 16 or 18
$n$ = 2, 3, 4 or 5

$$n:x<1:4$$

and a small proportion of a spermicidal agent dissolved in the base.

2. A vaginal suppository comprising a molded body of wax whose main component consists of a chemical compound designated by the following diagrammatic formula and equations:

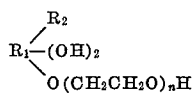

$R_1$ = a saturated cyclic inner ether containing 6 C atoms $R_2$ = radical of a fatty acid containing $x$ C atoms
$x$ = 14, 16 or 18
$n$ = 2, 3, 4 or 5

$$n:x<1:4$$

and a spermicidal agent incorporated in the body.

3. A vaginal suppository comprising a base consisting of a solid wax having a narrow melting range extending downward from 37° C. and having as its main component a polyoxyethylene ether of a partial ester of a fatty acid and a polyhydroxy hexitol cyclic inner ether, and a spermicidal agent incorporated in the base.

4. A vaginal suppository comprising a base consisting of a solid wax having a melting range extending downward from 37° C. and consisting of a main component which is a polyoxyethylene ether of a partial ester of a fatty acid and a polyhydroxy hexitol cyclic inner ether having a melting point approximating 37° C. within a few degrees and a minor component which is a polyoxyethylene ether of a partial ester of a fatty acid and a polyhydroxy hexitol cyclic inner ether having a number of oxyethylene groups different from that of the main component and a melting point substantially different from 37° C., and a spermicidal agent incorporated in the base.

5. A vaginal suppository comprising a major proportion of sorbitan monostearate hydroxy polyoxyethylene ether with 4 oxyethylene groups per mol., a minor proportion of sorbitan monostearate hydroxy polyoxyethylene ether with 20 oxyethylene groups per mol., and phenylmercuric acetate amounting to a fraction of one-thousandth of the whole composition by weight.

6. A vaginal suppository comprising a major proportion of sorbitan monostearate hydroxy polyoxyethylene ether with 4 oxyethylene groups per mol. and a minor proportion of glyceryl laurate, and a phenylmercuric salt amounting to a fraction of one-thousandth of the composition.

7. A vaginal suppository consisting of a major proportion of sorbitan monostearate hydroxy polyoxyethylene ether with 4 oxyethylene groups per mol. and a minor proportion of glyceryl laurate.

WILLIAM C. WARD.
ALBERT B. SCOTT.

REFERENCES CITED

The following references are of record in the file of this patent:

UNITED STATES PATENTS

| Number | Name | Date |
|---|---|---|
| 2,055,063 | Bird | Sept. 22, 1936 |
| 2,149,005 | Bockmuhl | Feb. 28, 1939 |
| 2,241,331 | Shelton | May 6, 1941 |
| 2,321,694 | Miller | June 15, 1943 |

OTHER REFERENCES

"Spans & Tweens," Nov. 1942, Booklet Atlas Powder Co., Wilmington, Delaware, pages 8 and 11.

Climenko: The Journal of Contraception, Sept. 1938, pages 149–153.

Baker et al.: The Journal of Contraception, October 1934, pages 192–193.

Leser: The Drug and Cosmetic Industry, July 1943, vol. 53, No. 1, pages 32–33, 105–109.